United States Patent
Asada et al.

(10) Patent No.: US 12,240,199 B2
(45) Date of Patent: Mar. 4, 2025

(54) WELDED MEMBER

(71) Applicant: NIPPON STEEL CORPORATION, Tokyo (JP)

(72) Inventors: Misaki Asada, Tokyo (JP); Hiroki Fujimoto, Tokyo (JP); Takehiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/702,221

(22) PCT Filed: Nov. 11, 2022

(86) PCT No.: PCT/JP2022/042145
§ 371 (c)(1),
(2) Date: Apr. 17, 2024

(87) PCT Pub. No.: WO2023/085410
PCT Pub. Date: May 19, 2023

(65) Prior Publication Data
US 2024/0326381 A1    Oct. 3, 2024

(30) Foreign Application Priority Data
Nov. 12, 2021  (JP) .................... 2021-184683

(51) Int. Cl.
*B23K 9/23*       (2006.01)
*B32B 15/01*      (2006.01)
(Continued)

(52) U.S. Cl.
CPC .............. *B32B 15/015* (2013.01); *B23K 9/23* (2013.01); *B23K 26/0006* (2013.01);
(Continued)

(58) Field of Classification Search
CPC .. C25D 3/12; B23K 26/0006; B23K 2103/08; B23K 2103/04; B32B 15/015
(Continued)

(56) References Cited

U.S. PATENT DOCUMENTS 5,049,206 A * 9/1991 Usui ..................... F01N 3/2842
                                                    428/941
5,110,690 A * 5/1992 Usui ....................... C23C 2/261
                                                    428/653
(Continued)

FOREIGN PATENT DOCUMENTS

JP   2005-256014 A   9/2005
JP   2014-47359 A    3/2014
(Continued)

OTHER PUBLICATIONS

Decision to Grant a Patent for Japanese Patent Application No. 2023-539371 dated Oct. 3, 2023.

*Primary Examiner* — Jimmy Chou
(74) *Attorney, Agent, or Firm* — Birch, Stewart, Kolasch & Birch, LLP

(57) ABSTRACT

To obtain a welded member using a steel sheet less expensive than a pure Ni sheet as a raw material and excellent in corrosion resistance. A welded member according to the present invention is made by connecting a Ni plated steel sheet having a Ni plating layer and a Fe—Ni diffusion alloy layer and another steel sheet via a welded part, wherein: a Ni concentration is 70 mass % or more and a Fe concentration is 30 mass % or less in a surface layer of each of a toe, a toe near area, and the welded part; and a thickness of the Fe—Ni diffusion alloy layer is 0.5 to 1.5 μm and a total thickness of the Ni plating layer and the Fe—Ni diffusion alloy layer is 2.7 to 14.0 μm at a non-welded part, and a total concentration of S and C in the Ni plating layer at the non-welded part is less than 20 ppm.

5 Claims, 3 Drawing Sheets

(51) Int. Cl.
 *B23K 26/00* (2014.01)
 *B23K 103/04* (2006.01)
 *B23K 103/08* (2006.01)
 *C25D 3/12* (2006.01)

(52) U.S. Cl.
 CPC ...... *B23K 2103/04* (2018.08); *B23K 2103/08* (2018.08); *C25D 3/12* (2013.01)

(58) Field of Classification Search
 USPC ......................................................... 428/596
 See application file for complete search history.

(56) References Cited

U.S. PATENT DOCUMENTS

| | | | | |
|---|---|---|---|---|
| 8,748,778 | B2* | 6/2014 | Kodama | C22C 38/02 |
| | | | | 219/137 R |
| 11,634,790 | B2* | 4/2023 | Mitsunobu | C23C 2/40 |
| | | | | 428/629 |
| 2002/0148533 | A1* | 10/2002 | Kim | B23K 35/3086 |
| | | | | 148/24 |
| 2002/0179583 | A1* | 12/2002 | Copeland | B23K 35/3033 |
| | | | | 219/137 WM |
| 2008/0093352 | A1* | 4/2008 | Jang | B23K 35/3053 |
| | | | | 219/145.22 |
| 2009/0158889 | A1* | 6/2009 | Kodama | C22C 38/04 |
| | | | | 420/57 |
| 2011/0253691 | A1* | 10/2011 | Kodama | B23K 35/0266 |
| | | | | 219/137 R |
| 2012/0009464 | A1* | 1/2012 | Nakazawa | C25D 3/66 |
| | | | | 429/163 |
| 2012/0202090 | A1* | 8/2012 | Yamamoto | B23K 20/2333 |
| | | | | 428/653 |
| 2012/0292294 | A1* | 11/2012 | Oda | B32B 15/012 |
| | | | | 219/118 |
| 2015/0162576 | A1* | 6/2015 | Horie | H01M 50/133 |
| | | | | 429/163 |
| 2016/0105980 | A1* | 4/2016 | Mori | H05K 7/02 |
| | | | | 361/728 |
| 2016/0318127 | A1* | 11/2016 | Gu | B23K 26/244 |

FOREIGN PATENT DOCUMENTS

| | | |
|---|---|---|
| JP | 2014-59954 A | 4/2014 |
| JP | 2017-75344 A | 4/2017 |
| WO | WO 2012/153728 A1 | 11/2012 |
| WO | WO 2017/006834 A1 | 1/2017 |

\* cited by examiner

WELDED MEMBER

TECHNICAL FIELD

The present invention relates to a welded member.

BACKGROUND ART

A Ni plated steel sheet obtained by performing annealing after electrolytic Ni plating to form a Fe—Ni diffusion alloy layer between a Ni plating layer and a steel sheet is conventionally used as a battery can by press-molding the Ni plated steel sheet (for example, refer to Patent Document 1 below).

PRIOR ART DOCUMENT

Patent Document

Patent Document 1: International Publication Pamphlet No. WO 2012/153728

DISCLOSURE OF THE INVENTION

Problems to be Solved by the Invention

For example, in a device used under high temperature and alkaline environments such as a hydrogen production device, it is required to ensure corrosion resistance of a metal sheet used as a raw material, so that a pure Ni sheet is generally used as the metal sheet. In this device, the metal sheet used as the raw material is generally welded to realize a desired shape.

On the other hand, the pure Ni sheet is relatively expensive, so that a welded member of a steel sheet high in corrosion resistance replacing the pure Ni sheet is required for cost reduction.

Hence, the present invention has been made in consideration of the above problem, and an object of the present invention is to provide a welded member using a steel sheet less expensive than a pure Ni sheet as a raw material and excellent in corrosion resistance.

Means for Solving the Problems

Here, the present inventors have conceived the use of a Ni plated steel sheet less expensive than the pure Ni sheet when realizing the cost reduction of the above device. However, the Ni plated steel sheet is conventionally generally subjected to a presswork as explained above, and is not intended to be subjected to a work in which great heat is generated, such as welding. The present inventors have found that in the manufacture of a welded member by welding the Ni plated steel sheet, pinholes are formed in a Ni plating layer near a toe, possibly causing deterioration in corrosion resistance.

Further, it has been found that when the Ni plated steel sheet is welded, Fe derived from the steel sheet thermally diffuses during the welding to reach the surface layer of the Ni plating layer, thereby possibly decreasing the Ni concentration in the Ni plating layer to cause deterioration in corrosion resistance.

From the above new findings obtained by the present inventors, it is conceived that there is room for improvement in ensuring the corrosion resistance in the case of manufacturing the welded member by welding the Ni plated steel sheet.

As a result of the earnest studies by the present inventors in order to solve the above problem, it has been found that welding a Ni plated steel sheet having a Fe—Ni diffusion alloy layer, in which a Ni plating layer is brought into a specific state, through use of a pure Ni-based welding wire makes it possible to manufacture a welded member excellent in corrosion resistance even in the case of using the Ni plated steel sheet as a raw material.

The gist of the present invention completed based on the findings is as follows.

(1) A welded member made by connecting a Ni plated steel sheet and another steel sheet via a welded part, wherein: the Ni plated steel sheet has a steel sheet which is a base sheet, a Ni plating layer located on the steel sheet, and a Fe—Ni diffusion alloy layer located between the steel sheet and the Ni plating layer; a Ni concentration is 70 mass % or more and a Fe concentration is 30 mass % or less in a surface layer of each of a toe prescribed by JIS Z3001 (2018), a toe near area which is an area of the Ni plated steel sheet at a distance from the toe in a direction away from the welded part of 10 µm or more and 1 mm or less, and the welded part; and when a portion which has not been subjected to welding in the Ni plated steel sheet is regarded as a non-welded part, a thickness of the Fe—Ni diffusion alloy layer is 0.5 to 1.5 µm and a total thickness of the Ni plating layer and the Fe—Ni diffusion alloy layer is 2.7 to 14.0 µm at the non-welded part, and a total concentration of S and C in the Ni plating layer at the non-welded part is less than 20 ppm.

(2) The welded member according to (1), wherein the Ni concentration and the Fe concentration in the surface layer of each of the toe, the toe near area, and the welded part are concentrations when performing element concentration measurement by Auger spectroscopy on faces obtained by removing surfaces of the toe, the Ni plated steel sheet, and the welded part by Ar ion etching until an oxygen concentration becomes 25 mass % or less.

(3) The welded member according to (1) or (2), wherein the Ni concentration is 90 mass % or more and the Fe concentration is 10 mass % or less, in the surface layer of each of the toe, the toe near area, and the welded part.

(4) The welded member according to any one of (1) to (3), wherein a Ni deposition amount of the Ni plated steel sheet is 20 to 100 g/m$^2$ in terms of metal.

(5) The welded member according to any one of (1) to (4), wherein a number of pinholes each having a circle-equivalent diameter of 10 µm or more existing in a rectangular area being an area having a length of 10 cm along an extending direction of the toe in an area at a distance of up to 1 mm from the toe in the direction away from the welded part on a surface of the Ni plating layer is three or less.

Effect of the Invention

As explained above, according to the present invention, it is possible to obtain a welded member using a steel sheet less expensive than a pure Ni sheet as a raw material and excellent in corrosion resistance.

EMBODIMENTS FOR CARRYING OUT THE INVENTION

Preferred embodiments of the present invention will be explained below in detail with reference to the accompanying drawings. Note that components having substantially the same functional configurations are denoted by the same reference signs in this description and the drawings to omit duplicate explanations.

(Regarding a Welded Member)

Figure 1:
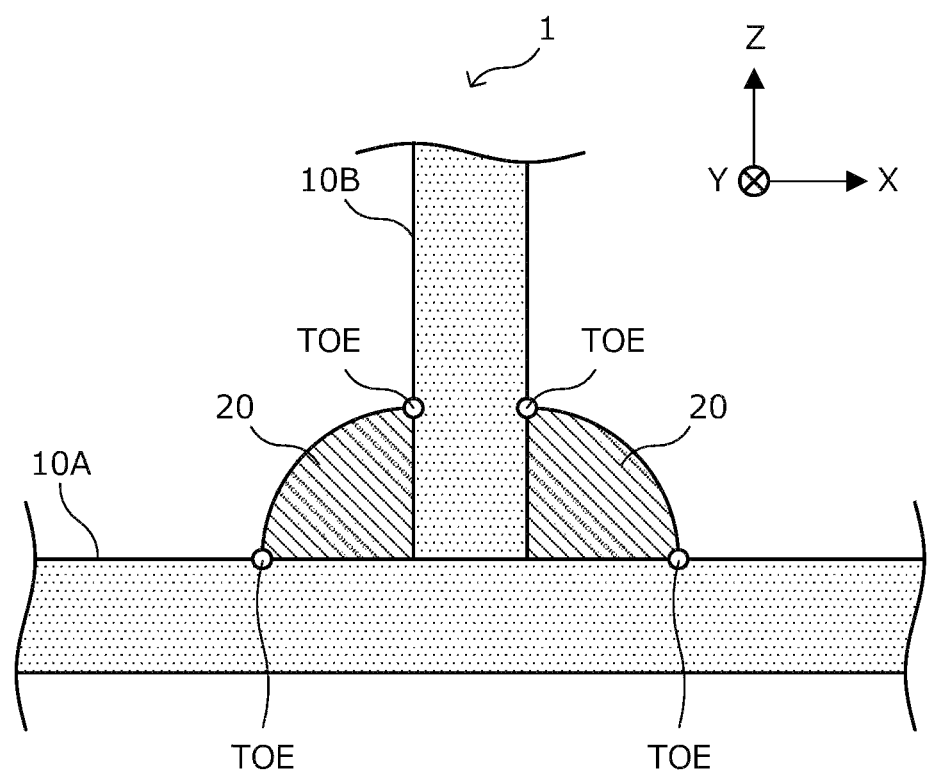
FIG. 1 is an explanatory view schematically illustrating an enlarged part of an example of a welded member according to an embodiment of the present invention.
Figure 2:
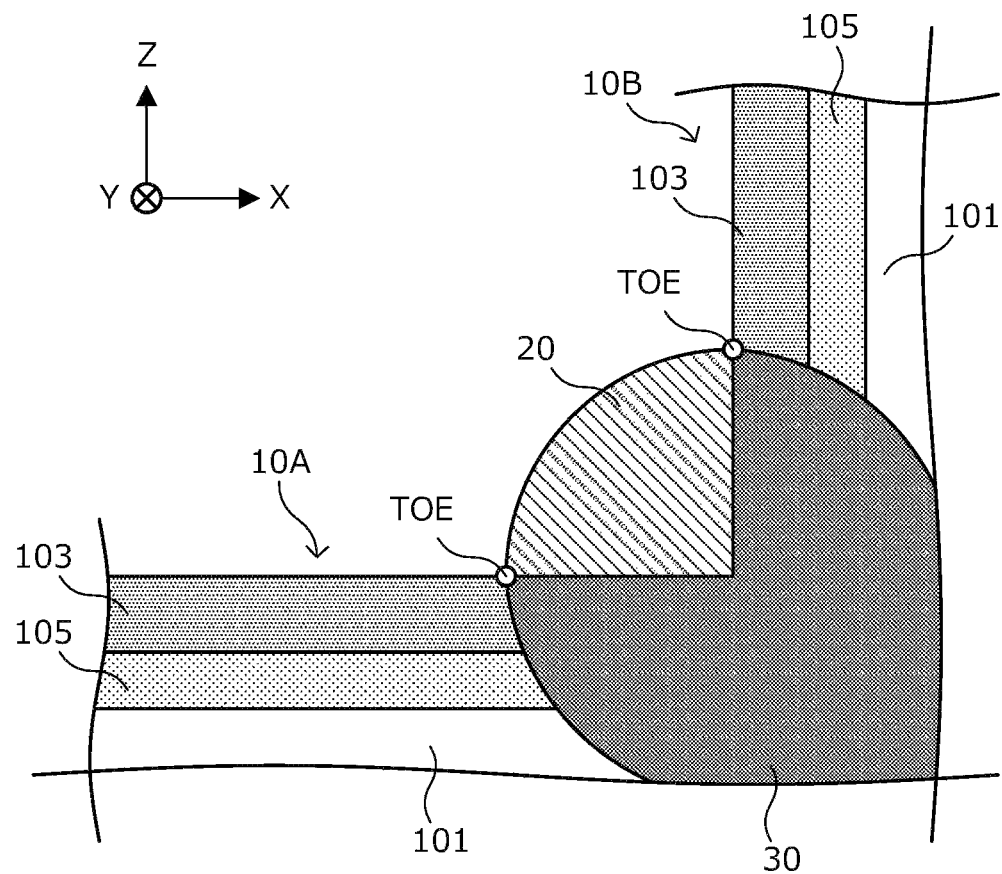
FIG. 2 is an explanatory view schematically illustrating an enlarged part of the example of the welded member according to the embodiment.
Figure 3:
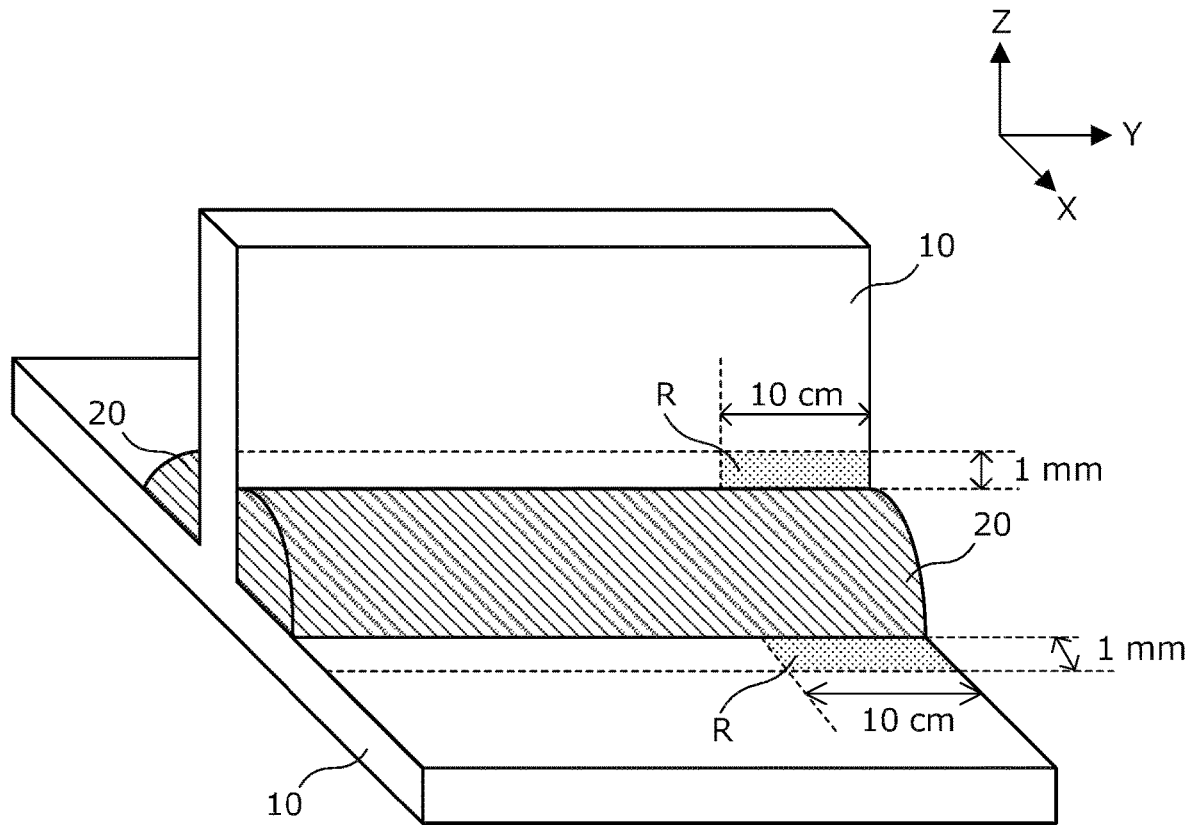
FIG. 3 is a schematic view for explaining the example of the welded member according to the embodiment.

Hereinafter, a welded member according to an embodiment of the present invention will be explained in detail with reference to FIG. 1 to FIG. 3. FIG. 1 and FIG. 2 are explanatory views schematically illustrating an enlarged part of an example of the welded member according to this embodiment. FIG. 3 is a schematic view for explaining the example of the welded member according to this embodiment.

The welded member according to this embodiment is a welded member made by connecting a Ni plated steel sheet and another steel sheet via a welded part. More specifically, the welded member is manufactured by welding a Ni plated steel sheet which will be explained in detail below with a Ni welding wire containing 90 mass % or more of Ni and having a total content of S and C of 0.1 mass % or less.

As schematically illustrated in FIG. 1, a welded member 1 according to this embodiment has Ni plated steel sheets 10A, 10B, and a welded part 20. Hereinafter, when explaining the Ni plated steel sheets 10A, 10B without distinction, they are also called Ni plated steel sheets 10. Here, a mode in which the Ni plated steel sheets are welded together will be explained, but not limited to this mode, at least one of the steel sheets constituting the welded member only needs to be the Ni plated steel sheet 10 explained below.

The details of the structure of the welded member 1 according to this embodiment will be explained with reference to FIG. 2. The welded member 1 includes the Ni plated steel sheets 10, the welded part 20, and an alloy part 30.

The Ni plated steel sheet 10 is a plated steel sheet having a Ni plating layer 103 and a Fe—Ni diffusion alloy layer 105 formed on the surface of a steel sheet 101 which is a base sheet as schematically illustrated in FIG. 2. The Ni plated steel sheet 10 will be explained again in detail below.

Besides, the welded part 20 is also called a weld bead part, and is a portion formed by welding the Ni plated steel sheets 10 with a Ni alloy or pure Ni welding wire. The welding causes interdiffusion of constituent elements between the Ni plating layer 103 and the Fe—Ni diffusion alloy layer 105 of the Ni plated steel sheet 10 and the Ni alloy or pure Ni welding wire to form the welded part 20. Further, accompanying the formation of the welded part 20, at a portion of the Ni plated steel sheet 10 which reacts with the welding wire, parts of the Ni plating layer 103, the Fe—Ni diffusion alloy layer 105, and the steel sheet 101 of the base material change to form into the alloy part 30. Note that the welded part 20 and the alloy part 30 can be discriminated by cross-section observation.

Hereinafter, a portion which has not been subjected to welding (for example, a portion in the Ni plated steel sheet 10 away by 5 mm or more from a later-explained toe) in the welded member 1 according to this embodiment is called a "non-welded part".

<Regarding the Ni Plated Steel Sheet 10>

The Ni plated steel sheet 10 according to this embodiment (more specifically, the Ni plated steel sheet 10 corresponding to the non-welded part) has the steel sheet 101 which is the base sheet, the Ni plating layer 103 located on the steel sheet 101, and the Fe—Ni diffusion alloy layer 105 located between the steel sheet 101 and the Ni plating layer 103 as schematically illustrated in FIG. 2.

Here, the steel sheet 101 to be used as the base sheet of the Ni plated steel sheet 10 according to this embodiment is not particularly limited, but various steel sheets can be used according to the mechanical strength or the like required for the Ni plated steel sheet 10. Examples of the steel sheet 101 include various types of steel such as various types of Al killed steel, ultralow carbon steel containing Ti, Nb, or the like, and high-strength steel further containing a strengthening element such as P, Si, Mn in the ultralow carbon steel.

The thickness of the steel sheet 101 is not particularly limited, but may be appropriately set according to the mechanical strength or the like required for the Ni plated steel sheet 10.

Further, in the Ni plated steel sheet 10 according to this embodiment, the Fe—Ni diffusion alloy layer 105 means a portion having a Ni concentration, which is obtained through analysis only of metal elements when performing a cross-sectional analysis by a scanning electron microscope (SEM) equipped with an energy dispersive X-ray analyzer (EDS) (hereinafter, abbreviated as a SEM-EDS) under the following conditions, in a range of 30 mass % or more and less than 70 mass %. Besides, the Ni plating layer 103 according to this embodiment means a portion having a Ni concentration, which is obtained through the analysis only of metal elements when performing the cross-sectional analysis by the SEM-EDS under the following conditions, of 70 mass % or more.

Here, the measurement conditions of the SEM-EDS in the above analysis only need to be, for example, an acceleration voltage of 15.0 kV, an irradiation current of 0.00564 nA, and an energy range of 0 to 20 keV.

A Ni deposition amount of the Ni plated steel sheet 10 (more specifically, a total Ni deposition amount of the Ni plating layer 103 and the Fe—Ni diffusion alloy layer 105) is preferably 20 to 100 g/m$^2$ per side in terms of metal. When the Ni deposition amount is less than 20 g/m$^2$, the corrosion resistance required for the welded member 1 cannot be sufficiently exhibited in some cases. By setting the Ni deposition amount to 20 g/m$^2$ or more, it is possible to sufficiently exhibit the corrosion resistance required for the welded member 1. The Ni deposition amount of the Ni plated steel sheet 10 is more preferably 30 g/m$^2$ or more, and furthermore preferably 40 g/m$^2$ or more. On the other hand, when the Ni deposition amount of the Ni plated steel sheet 10 is more than 100 g/m$^2$, the corrosion resistance of the Ni plated steel sheet 10 is saturated, whereas the cost when applying the Ni plating tends to increase. By setting the Ni deposition amount to 100 g/m$^2$ or less, it becomes possible to sufficiently exhibit the corrosion resistance while suppressing the increase in cost. The Ni deposition amount of the Ni plated steel sheet 10 is more preferably 90 g/m$^2$ or less, and furthermore preferably 60 g/m$^2$ or less.

Here, the Ni deposition amount can be measured as follows.

In the welded member 1 to focus, a 10 mm square area toward the non-welded part side using a position 5 mm from the toe illustrated in FIG. 2 toward the non-welded part (namely, in a direction away from the welded part 20) as a starting point is cut in the thickness direction by a high-speed precision cutting machine, and used as a specimen for measurement of the Ni deposition amount. The specimen thus cut out is sealed on a single side with Teflon tape, and then polished from the rear side in a manner to leave the Ni plating layer and the Fe—Ni diffusion alloy layer on the sealed side. The specimen after the polishing is immersed in a 35% hydrochloric acid until the base sheet can be removed, to obtain a sample. The obtained sample is subjected to measurement by ICP (Inductively Coupled Plasma) emission spectrometry (for example, ICPS-8100 manufactured by SHIMADZU CORPORATION), whereby the Ni amount is quantified and converted to a deposition amount by $g/m^2$ and the Ni deposition amount is obtained.

Besides, in the Ni plated steel sheet 10 according to this embodiment, the Ni plating layer 103 (the Ni plating layer 103 corresponding to the non-welded part) is not particularly limited as long as it is Ni plating having a Ni concentration of 70 mass % or more, and various types of Ni plating including various types of electric Ni plating and non-electrolytic Ni plating can be applied. The Ni concentration in the Ni plating layer 103 is more preferably 80 mass % or more, and furthermore preferable 90 mass % or more.

However, in this embodiment, a total concentration of S (sulfur) and C (carbon) in the Ni plating layer 103 is less than 20 ppm.

As a result of earnest studies by the present inventors for conceiving the welded member according to the present invention, it has been found that when an as-plated Ni plated steel sheet is welded, H which is a plating co-deposit vaporizes near the toe to form a pinhole, causing deterioration in the corrosion resistance. It has been further found that particularly when bright Ni plating containing S and C is applied as Ni plating, S and C co-deposited by welding also vaporize to be more likely to form pinholes. As a result of further studies by the present inventors based on these findings, it has been found that when the total concentration of S and C in the Ni plating layer is more than 20 ppm, the pinholes are formed due to the co-deposited S and C.

Here, the above "toe" is a position prescribed by JIS Z3001 (2018), and corresponds to a portion where the surface of a base material (namely, a steel sheet which is a base sheet) and the surface of a weld bead (namely, the welded part 20) intersect. In this embodiment, it corresponds to a portion where the surface of the Ni plating layer 103 in the Ni plated steel sheet 10 and the surface of the welded part 20 intersect. The position of the "toe" is schematically illustrated in FIG. 1 and FIG. 2. The toe in the welded member 1 illustrated in FIG. 1 and FIG. 2 can be regarded as a line segment extending in a Y-axis direction.

From the above viewpoints, the total concentration of S and C is set to less than 20 ppm in the Ni plating layer 103 according to this embodiment (specifically, the Ni plating layer 103 at the non-welded part). The lower the total concentration of S and C in the Ni plating layer 103, the better, and 0 ppm is more preferable.

The concentration analysis of S and C in the Ni plated steel sheet is performed for the Ni plated steel sheet 10 being the non-welded part using EMIA-920V2 which is a carbon and sulfur analyzer manufactured by HORIBA, Ltd. More specifically, the Ni plated steel sheet is sealed on a single side with Teflon tape, and then polished from the rear side in a manner to leave the Ni plating layer on the sealed side. The specimen after the polishing is immersed in a 35% hydrochloric acid until the base sheet and the Fe—Ni diffusion alloy layer can be removed, to obtain Ni foil. The seal is peeled off and the resultant Ni foil is made into a diameter of 2 to 3 mm, put into a ceramics crucible, and baked in an oxygen flow. The generated $CO_2$, CO, $SO_2$ gasses are detected by an infrared detector, and results of conversion to carbon and sulfur based on the detection results are regarded as concentrations of S and C in the Ni plated steel sheet.

Note that in order to realize the above state, it is important to appropriately limit the total concentration of S and C in a plating bath to be used for Ni plating when performing Ni plating on the steel sheet 101, and it is particularly important not to perform bright Ni plating (not to use a brightener containing S and C).

Besides, the present inventors have also found that it is possible to practically eliminate the existence of H which is a plating co-deposit in the as-plated Ni plating layer by an annealing treatment prior to the welding. The annealing treatment will be explained again in more detail below.

Examples of the above-explained Ni plating include pure Ni plating.

Besides, in the non-welded part according to this embodiment, an average thickness (hereinafter, simply referred to as a thickness) of the Fe—Ni diffusion alloy layer 105 is 0.5 to 1.5 µm, and an average total thickness (hereinafter, simply referred to as a thickness) of the Ni plating layer 103 and the Fe—Ni diffusion alloy layer 105 is 2.7 to 14.0 µm. The average thickness of the Fe—Ni diffusion alloy layer 105 is preferably 0.7 µm or more or 1.0 µm or more, and preferably 1.3 µm or less. The average total thickness of the Ni plating layer 103 and the Fe—Ni diffusion alloy layer 105 is preferably 3.0 µm or more or 4.0 µm or more, and preferably 12.5 µm or less or 10.0 µm or less. When the thickness of the Fe—Ni diffusion alloy layer 105 and the total thickness of the Ni plating layer 103 and the Fe—Ni diffusion alloy layer 105 fall within the above ranges in the non-welded part, the Ni plated steel sheet 10 according to this embodiment can realize the corrosion resistance at a level at which sufficient corrosion resistance can be maintained even under high temperature and alkali conditions. Further, when an average thickness of the Ni plating layer 103 is 1.7 µm or more, overdiffusion of Fe to the surface layer can be prevented in and around the welded part during welding. When the thickness of the Fe—Ni diffusion alloy layer 105 falls within the above range, co-deposition of C and S during welding can be prevented. On the other hand, when the thickness of the Fe—Ni diffusion alloy layer 105 is 1.5 µm or more, the plating adhesiveness lowers to deteriorate the corrosion resistance.

Note that the thickness of the Ni plating layer 103 and the thickness of the Fe—Ni diffusion alloy layer 105 are measured in cross-sectional view of cutting in the thickness direction at a position 5 mm from the toe toward the non-welded part side in surface view. In more detail, a 10 mm square area toward the non-welded part side using a position 5 mm from the toe toward the non-welded part side as a starting point in surface view is cut in the thickness direction, and used as a specimen for cross-section observation. The specimen is embedded in a resin and polished to obtain a cross section as an observational object, and the cross section is observed by the SEM-EDS for measurement. In other words, elemental analysis is performed in the cross section while focusing only on metal elements, and the thickness of an area where the obtained Ni concentration is within a range of 30 mass % or more and less than 70 mass % (namely, the Fe—Ni diffusion alloy layer 105) and the thickness of an area where the obtained Ni concentration is 70 mass % or more (namely, the Ni plating layer 103) are measured. This measurement is performed at arbitrary ten locations within the cross section. An average value of remaining eight measured values after excluding the maximum value and the minimum value of the obtained measured values is regarded as the thickness of each of the Fe—Ni diffusion alloy layer 105 and the Ni plating layer 103.

<Regarding the Welded Part 20>

The welded part 20 according to this embodiment is preferably a Ni alloy having a Ni concentration (more specifically, an average concentration of Ni) of 70 mass % or more. The welded part 20 is formed by performing welding by a welding method explained in detail below using a welding wire of Ni alloy or pure Ni. When the welded part 20 is a Ni alloy having a Ni concentration of 70 mass % or more, the possibility of ensuring the corrosion resistance at a welded point where the Ni plating layer 103 disappears increases. The measurement of the Ni concentration of the welded part 20 is performed as follows. First, the cross section obtained by cutting the welded part 20 at an X-Z plane illustrated in FIG. 1 is embedded and polished, and subjected to cross-section observation. The concentration measurement is performed at arbitrary ten locations within the cross section. An average value of remaining eight measured values after excluding the maximum value and the minimum value of the obtained measured values is regarded the average concentration of Ni.

The Ni concentration of the welded part 20 is preferably 90 mass % or more. The welded part 20 has the Ni concentration and thereby can surely ensure the corrosion resistance at the welded point.

<Regarding the Ni, Fe Concentrations in the Surface Layer of Each of the Toe, the Ni Plated Steel Sheet (Near the Toe Part), and the Welded Part>

The welded member 1 according to this embodiment has a Ni concentration of 70 mass % or more and a Fe concentration of 30 mass % or less in the surface layer of each of the toe prescribed by JIS Z3001 (2018), the Ni plated steel sheet 10, and the welded part 20. Here, the position of the Ni plated steel sheet whose Ni concentration is measured is an area of the Ni plated steel sheet 10 at a distance from the toe toward the non-welded part side (namely, in a direction away from the welded part 20) of 10 μm or more and 1 mm or less (hereinafter, this area is also referred to as a toe near area). Generally, the welding causes thermal diffusion of an element Fe derived from the Ni plated steel sheet. In the welded member 1 according to this embodiment, the proportion of Fe diffused to the surface layer of each of the toe, the toe near area, and the welded part 20 is suppressed to 30 mass % or less. When the surface layer of each of the toe, the toe near area, and the welded part 20 has the above Ni concentration and Fe concentration, it is possible to realize the corrosion resistance at a level at which sufficient corrosion resistance can be maintained even under high temperature and alkali environments. This configuration is effective particularly for maintaining the corrosion resistance of the Ni plated steel sheet at the welded part or the toe part or near the toe.

The Ni concentration in the surface layer of each of the toe, the toe near area, and the welded part 20 is preferably 90 mass % or more. Further, the Fe concentration in the surface layer of each of the toe, the toe near area, and the welded part 20 is preferably 10 mass % or less.

Here, an oxide coating film produced by a reaction with oxygen in the atmosphere or dirt such as fats and oil may adhere to the surfaces of the toe, the toe near area, and the welded part 20. Therefore, the above Ni concentration and Fe concentration are desirably measured in a state where the oxide coating film, dirt, and so on do not exist. From this viewpoint, the above Ni concentration and Fe concentration are assumed to be concentrations when performing element concentration measurement by Auger spectroscopy, in a field of view where the surfaces of the toe, the toe near area, and the welded part 20 can be observed, on faces obtained by removing the surfaces in the thickness direction from the surfaces by Ar ion etching until the oxygen concentration becomes 25 mass % or less. Note that the removal by the Ar ion etching only needs to be performed until the surface layer of each of the toe, the toe near area, and the welded part 20 can be observed, and a range to be removed by the Ar ion etching preferably has a depth of within 1 μm from the surface of each of the toe, the toe near area, and the welded part 20.

Besides, the measurement conditions of the element concentration measurement by the Auger spectroscopy only need to be, for example, an acceleration voltage of 15 kV and an irradiation current of 10 nA. In more detail, the element concentration measurement (measurement only of metal elements) by the Auger spectroscopy is performed under the measurement conditions at arbitrary five locations within the observation plane for the toe near area and the welded part 20 and at arbitrary five locations on an intersection line of the welded part 20 and the Ni plated steel sheet 10 within the observation plane for the toe. An average of three measured values excluding the maximum value and the minimum value of the obtained five measured values of each of the Ni concentration and Fe concentration is regarded as each of the Ni concentration and the Fe concentration.

Note that the above surface layer concentrations are realized only by performing welding by the welding method explained in detail below. The detailed welding method will be explained again below.

<Regarding the Average Number of Pinholes Each Having a Circle-Equivalent Diameter of 10 μm or More>

As mentioned earlier, it has been found that when the as-plated Ni plated steel sheet is welded, H which is a plating deposit vaporizes near the toe to form a pinhole, causing deterioration in the corrosion resistance. It has been further found that when Ni plating containing S and C is applied to the plating layer as Ni plating, S and C co-deposited by welding also vaporize to be more likely to form pinholes. A smaller number of pinholes each having a circle-equivalent diameter of 10 μm or more is more preferable because the pinhole having a circle-equivalent diameter of 10 μm or more becomes a starting point of red rust generation.

To suppress the generation of the above pinholes, the present inventors have conceived limiting the total concentration of S and C in the Ni plating layer 103 to 20 ppm or less and performing the annealing treatment on the Ni plated steel sheet 10 prior to the welding. This makes it possible to eliminate the existence of S and C which can vaporize, and makes it possible to make H which is a plating co-deposit vaporize during the annealing treatment. Further, the pinhole formed by vaporization of H during the annealing treatment is repaired under the heating environment for the annealing treatment. Owing to this treatment, the average number of pinholes each having a circle-equivalent diameter of 10 μm or more which can be generated as a result of welding is extremely low in the welded member 1 according to this embodiment. Also from this viewpoint, the welded member 1 according to this embodiment has excellent corrosion resistance.

Specifically, as schematically illustrated in FIG. 3, an area having a length of 10 cm along an extending direction in an area at a distance of up to 1 mm from the toe toward the non-welded part side on the surface of the Ni plating layer 103 is regarded as a rectangular area R. A plurality of such rectangular areas R can be assumed in the welded member 1 according to this embodiment. In the welded member 1 according to this embodiment, the average number of pinholes each having a circle-equivalent diameter of 10 μm or more existing in the rectangular areas R at arbitrary five adjacent locations is three or less. This shows that the welded member 1 according to this embodiment has excellent corrosion resistance even near the welded part 20.

Note that the average number of pinholes each having a circle-equivalent diameter of 10 μm or more as above can be counted by observation with the SEM. The observation is performed at the above five locations and the number of pinholes each having a circle-equivalent diameter of 10 μm or more is counted in each of the rectangular areas R. The average of three counted values excluding the maximum value and the minimum value of obtained five counted values is regarded as the average number of pinholes.

The welded member 1 according to this embodiment has been explained in detail with reference to FIG. 1 to FIG. 3.

(Regarding an Example of a Manufacturing Method of the Welded Member)

Next, a manufacturing method of the welded member according to this embodiment will be explained with an example.

The welded member according to this embodiment is manufactured by manufacturing a Ni plated steel sheet having a Fe—Ni diffusion alloy layer and then welding the Ni plated steel sheet using a Ni welding wire. The fusion bonding of the Ni plated steel sheet having the Fe—Ni diffusion alloy layer by using the Ni welding wire is not conventionally performed. Besides, only by welding the Ni plated steel sheet having the Fe—Ni diffusion alloy layer with the Ni welding wire, the welded member according to this embodiment cannot be obtained, and therefore it is important to bring the thickness of the Fe—Ni diffusion alloy layer into a desired state and then control the heat input amount at welding.

<An Example of the Manufacturing Method of the Ni Plated Steel Sheet>

The Ni plated steel sheet is manufactured by performing Ni plating to achieve a desired deposition amount on the surface of the steel sheet which is the base sheet using a predetermined Ni plating bath and then performing an annealing treatment.

Here, it is possible to use, as the Ni plating bath, various types of Ni plating baths adjusted so that the total concentration of S and C is less than 20 ppm. Examples of the Ni plating bath include a Watts bath, a nickel sulfate bath, a nickel chloride bath, and so on. The electric Ni plating is performed so that the plating deposition amount becomes 15 to 100 g/m$^2$ in terms of metal. Here, the plating deposition amount can be adjusted by controlling the current density, energization time, or the like during the electric plating.

Thereafter, an annealing treatment is performed on the obtained Ni plated steel sheet. This causes Fe derived from the steel sheet and Ni derived from the Ni plating layer to mutually thermally diffuse to form a Fe—Ni diffusion alloy layer and vaporize H which is a plating co-deposit. As a result, the Ni plated steel sheet can be obtained which has the Fe—Ni diffusion alloy layer and the Ni plating layer and is suppressed in generation of pinholes each having a circle-equivalent diameter of 10 μm or more even when welding.

Here, in the annealing treatment, it is preferable to hold a holding temperature, for example, of 600 to 850° C. for 5 to 60 seconds. This makes it possible to more surely form a desired Fe—Ni diffusion alloy layer and more surely vaporize H which is a plating co-deposit. The holding temperature is more preferably 700 to 850° C., and the holding time is more preferably 20 to 60 seconds.

A temperature increasing rate from room temperature to the holding temperature is preferably, for example, 5 to 100° C./sec. Further, it is preferable to cool the Ni plated steel sheet down to 200° C. by $N_2$ gas cooling after a lapse of the desired holding temperature, and then take it out to the air atmosphere.

Further, it is preferable to perform the annealing treatment, for example, under environments of a 2% $H_2$—$N_2$ atmosphere and a dew point of −60° C.

<Example of the Welding Method>

For example, the Ni plated steel sheet having the Fe—Ni diffusion alloy layer manufactured as above is welded using a welding wire of a Ni alloy containing 90 mass % or more of Ni or pure Ni containing 99 mass % or more of Ni, which has a desired Ni concentration. Here, as the welding method, laser welding or arc welding can be used. For the welded member 1 according to this embodiment, a mode in which the Ni plated steel sheet and the Ni sheet are welded together can be applied, but a mode in which the Ni plated steel sheets are welded together is preferable from viewpoint of cost reduction. Note that there is spot welding as one welding method, but at least in the case of using the spot welding as the method of welding the Ni plated steel sheets, the welded part having a Ni concentration of 70 mass % or more focused in this embodiment cannot be realized. In the case of the laser welding, fiber laser, disk leather, and semiconductor laser are preferable. Besides, in the case of the arc welding, the use of a low heat input welding process such as Cold Metal Transfer (CMT (registered trademark)) is more preferable in order to bring the diffusion of Fe by the heat input at the welding into a desired state. Further, Synchro-feed (registered trademark) GMA welding and S-AWP (Super Active Wire Feed Process) welding are also preferable. These are different in name depending on the welder manufacturer but are welding methods equivalent to CMT.

More specifically, in the case of the laser welding, it is preferable to use a welding wire having a diameter of 0.6 mm to 1.6 mm and adjust the beam so that the beam has a laser beam diameter of 0.8 to 3.5 times the welding wire diameter. In this event, it is preferable to perform welding by supplying the welding wire to a laser irradiation part at a speed of 0.6 to 4.0 times the welding speed. Further, in order to prevent oxidation of the laser welded part, it is preferable to use argon, helium, nitrogen, or carbon dioxide gas, or a mixed gas of them as a shielding gas, and more preferable to use an argon gas. Further, it is preferable to adjust the flow rate of the shielding gas to 10 to 70 L/min. In order to bring the diffusion of Fe by the heat input at the welding into a desired state, the output and speed of the laser only need to be appropriately adjusted. For example, it is preferable to adjust the output of the laser in a range of 0.8 to 12 kW, and the welding speed in a range of 0.5 to 15 m/min.

Besides, in the case the arc welding, it is preferable to use a welding wire having a diameter of 0.6 mm to 1.6 mm. In order to stabilize the arc while preventing oxidation of the welded part, it is preferable to use an argon gas or a shielding gas made by adding 3% or less of a carbon dioxide gas or oxygen to argon. Here, it is preferable to adjust the flow rate of the shielding gas to 10 to 50 L/min. As the conditions of the arc welding, in order to bring the diffusion of Fe by the heat input at the welding into a desired state, it is preferable to adjust the current and the welding speed. For example, it is preferable to adjust the current in a range of 60 to 250 A and the welding speed in a range of 0.2 to 1.8 m/min. Besides, TIG welding or plasma welding using the Ni wire may also be used.

In the manufacturing method of the welded member according to this embodiment, melt welding is performed by controlling the heat input amount to an appropriate value using the Ni wire while appropriately controlling the thicknesses of the Ni plating layer and the Fe—Ni diffusion alloy layer. This can set the Ni concentration in the surface layer of each of the toe, the toe near area, and the welded part in the welded member to an appropriate value (70 mass % or more).

The welded member according to this embodiment is manufactured as above.

EXAMPLES

Hereinafter, the welded member according to the present invention will be concretely explained while illustrating examples and comparative examples. Note that the examples below are merely examples of the welded member according to the present invention and the welded member according to the present invention is not limited to the following examples.

<Manufacture of the Ni Plated Steel Sheet>

In this test example, B-added Al-killed steel (sheet thickness of 1 mm) was prepared as the steel sheet being the base sheet. As the Ni plating bath to be used for the Ni plating, a Watts bath having a bath composition listed in Table 1 below was prepared. Further, a bright plating bath with 0.2/L of butynediol as a carbon source and 2 g/L of saccharin Na as a sulfur source added to the Watts bath listed in Table 1 below was prepared for comparison. Besides, the current density at electroplating was set to 20 $A/dm^2$, and a desired plating deposition amount was realized by changing the energization time.

[Table 1]

TABLE 1

| WATTS BATH COMPOSITION AND BATH TEMPERATURE | |
|---|---|
| NICKEL SULFATE HEXAHYDRATE | 250 g/L |
| NICKEL CHLORIDE HEXAHYDRATE | 50 g/L |
| BORIC ACID | 30 g/L |
| BATH TEMPERATURE | 50° C. |

After the above plating, an annealing treatment was carried out in a 2% $H_2$—$N_2$ atmosphere and under an environment of a dew point of −60° C. In the annealing treatment, the Ni plated steel sheet was heated from room temperature to the predetermined holding temperature at a temperature increasing rate of 25° C./sec, the holding temperature was held for a predetermined time, and then the Ni plated steel sheet was cooled down to 200° C. by $N_2$ gas cooling and taken out to the air atmosphere. The holding temperature and the holding time are as listed in Table 6 below.

<Welding Treatment>

Figure 4:
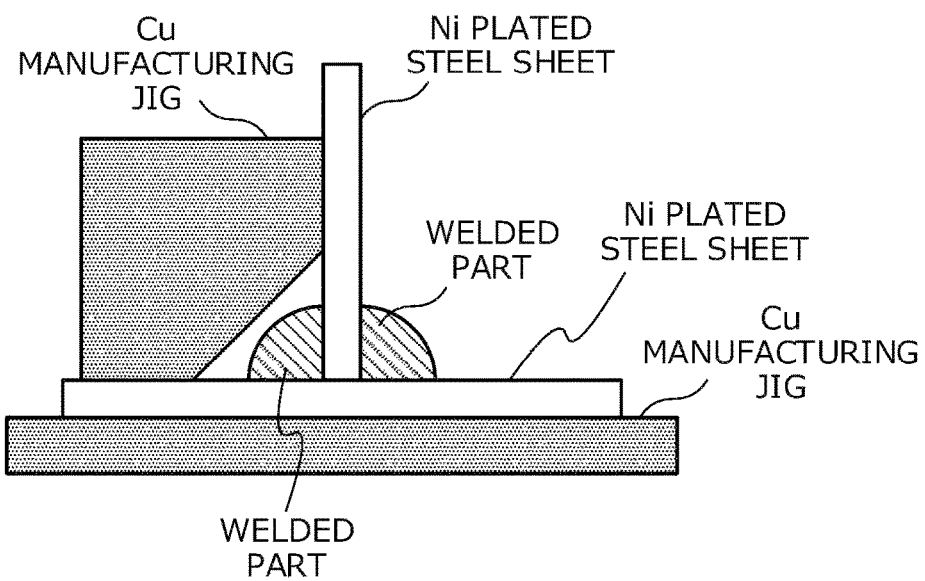
FIG. 4 is an explanatory view for explaining a welded member fabricated in a test example.

The obtained Ni plated steel sheet was cut into a size of 150 mm×50 mm and used for welding. The atmosphere of the welding place was set to 10° C. and 20% RH. A Cu manufacturing jig of 100 mm×200 mm and a thickness of 20 mm and a Cu manufacturing jig of 30 mm×200 mm and a thickness of 20 mm with a cutout of 5 mm as schematically illustrated in FIG. 4 were cooled to −20° C. with dry ice, and the Ni plated steel sheet was fixed to the manufacturing jigs and subjected to fillet welding using a Ni wire having a diameter of 1.2 mm.

The details of the wire used for the welding are as listed in Table 2 below. Further, as the welding method, one of the laser welding and two types of arc welding was carried out. The welding conditions of each welding are as listed in Table 3 to Table 5 below. Note that the welding conditions of the arc welding listed in Table 5 below are set so that the heat input amount to the Ni plated steel sheet is excessive by setting the voltage high.

[Table 2]

TABLE 2

| | | WELDING WIRE | | | | | | | |
|---|---|---|---|---|---|---|---|---|---|
| | | EQUIVALENT STANDARD | | CHEMICAL COMPOSITION (mass %) BALANCE IS IMPURITIES | | | | | |
| | TYPE | JIS | AWS | C | Mn | Fe | Si | Cu | Ni |
| Ni1 | WEL MIG Ni-1 | YNi-1 | ERNi-1 | 0.002 | 0.32 | 0.06 | 0.32 | 0.01 | 96.4 |
| Ni2 | WEL TIG Ni-1 | SNi2061 | ERNi-1 | 0.006 | 0.31 | 0.002 | 0.28 | 0.01 | 96.5 |

[Table 3]

TABLE 3

| LASER TYPE | LASER WELDING CONDITIONS | | | | |
|---|---|---|---|---|---|
| | OUTPUT (kW) | SPEED (m/min) | WIRE FEEDING RATE (m/min) | DEFOCUSING (mm) | GAS |
| FIBER LASER | 2 | 2 | 2 | 20 | Ar 20 L/min |

[Table 4]

TABLE 4

| ARC WELDING CONDITIONS | | | | | | |
|---|---|---|---|---|---|---|
| WELDING SOURCE | SHIELDING GAS | SET CURRENT (A) | WIRE FEEDING RATE (m/min) | VOLTAGE (V) | WELDING SPEED (cm/min) | PROJECTION (mm) |
| FRONIUS GMBH CMT | Ar 20 L/min | 90 | 3.3 | 8 | 50 | 10 |

[Table 5]

TABLE 5

| ARC WELDING CONDITIONS (COMPARATIVE EXAMPLE) | | | | | |
|---|---|---|---|---|---|
| WELDING SOURCE | SHIELDING GAS | SET CURRENT (A) | VOLTAGE (V) | WELDING SPEED (cm/min) | PROJECTION (mm) |
| DAIHEN WELBEE M500 | Ar 20 L/min | 95 | 22 | 55 | 12 |

As is similar to the above, the Ni concentration and Fe concentration in the surface layer of each of the toe, the toe near area of the Ni plated steel sheet (an area at a distance from the toe toward the non-welded part side of 10 μm or more and 1 mm or less), and the welded part were measured by the Auger spectroscopy. The Auger spectrometer used is JAMP-9500F manufactured by JEOL Ltd. Note that in this concentration measurement, faces obtained by removing the surfaces of the toe, the Ni plated steel sheet, and the welded part by Ar ion etching until the oxygen concentration became 25 mass % or less were regarded as measuring surfaces. The removal amount by the Ar ion etching was within 1 μm in the thickness direction in any specimen. The element concentration measurement (measurement only of metal elements) by the Auger spectroscopy was carried out at arbitrary five points within the observation plane (arbitrary five points on the intersection line of the welded part and the Ni plated steel sheet within the observation plane in the case of the toe) at the measurement conditions of an acceleration voltage of 15 kV and an irradiation current of 10 nA. An average of three measured values excluding the maximum value and the minimum value of the obtained five measured values of each of the Ni concentration and the Fe concentration was regarded as each of the Ni concentration and the Fe concentration.

In the obtained welded member, a 10 mm square area toward the non-welded part side using a position 5 mm from the toe in FIG. 2 toward the non-welded part side as a starting point was cut in the thickness direction using a high-speed precision cutting machine, and used as a specimen for measurement of the Ni deposition amount. The specimen thus cut out was sealed on a single side with Teflon tape, and then polished from the rear side in a manner to leave the Ni plating layer and the Fe—Ni diffusion alloy layer on the sealed side. The specimen after the polishing was immersed in a 35% hydrochloric acid until the base sheet was removed, to obtain a sample. The obtained sample was subjected to measurement by ICP (Inductively Coupled Plasma) emission spectrometry (for example, ICPS-8100 manufactured by SHIMADZU CORPORATION), whereby the Ni amount was quantified and converted to a deposition amount by $g/m^2$ and the Ni deposition amount was obtained.

<Analysis>

Each obtained welded member was in the thickness direction cut at a position 5 mm from the toe in FIG. 2 toward the non-welded part side using a high-speed precision cutting machine. In more detail, a 10 mm square area toward the non-welded part side using a position 5 mm from the toe toward the non-welded part side as a starting point in surface view was cut in the thickness direction. Thus, a cross-section observation specimen and a surface observation specimen were cut out and subjected to analysis. For the analysis, a SEM (JSM-7000F manufactured by JEOL Ltd.) was used, and the cross section and the surface were observed using reflected electrons. Note that when performing the cross-sectional analysis by a SEM-EDS under conditions of an acceleration voltage of 15.0 kV, an irradiation current of 0.00564 nA, and an energy range of 0 to 20 keV, analysis only of metal elements was performed, and a portion where the obtained Ni concentration was 70 mass % or more was regarded as a Ni plating layer, and a portion where the obtained Ni concentration was in a range of 30 mass % or more and less than 70 mass % was regarded as a Fe—Ni diffusion alloy layer. The measurement of the thickness of the Fe—Ni diffusion alloy layer and the thickness of the Ni plating layer was carried out at arbitrary ten locations within the cross section. An average value of remaining eight measured values after excluding the maximum value and the minimum value of the obtained measured values was regarded as the thickness of each of the Fe—Ni diffusion alloy layer and the Ni plating layer, and the total of them was regarded as a total thickness.

[Analysis 1: Confirmation of the C and S Concentrations in the Ni Plating Layer]

The detection limit of the element concentration in the SEM-EDS analysis used for the confirmation of the Ni plating layer is 1500 to 2000 ppm, and therefore the concentration analysis of S and C in the Ni plated steel sheet was carried out for the specimens before embedding, using EMIA-920V2 being a carbon and sulfur analyzer manufactured by HORIBA, Ltd. More specifically, the Ni plated steel sheet was sealed on a single side with Teflon tape, and then polished from the rear side in a manner to leave the Ni plating layer on the sealed side. The specimen after the polishing was immersed in a 35% hydrochloric acid until the base sheet and the Fe—Ni diffusion alloy layer were removed, to obtain Ni foil. The seal was removed and the obtained Ni foil was formed into a diameter of 2 to 3 mm and put into a ceramics crucible and baked in an oxygen flow. The generated $CO_2$, CO, $SO_2$ gasses were detected by an infrared detector, and converted to carbon and sulfur. A detection lower limit of each element by the measurement method is C: 3 ppm and S: 1 ppm. A concentration equal to or lower than the detection lower limit was regarded as OK, and a concentration of 20 ppm or more was regarded as NG.

[Analysis 2: Confirmation of the Number of Pinholes at the Toe by the Surface Observation]

As the specimen for the surface observation, a portion of the cross-section observation specimen located at a shortest distance cut out by a length of 50 cm was used. The cut-out portion was cut in units of 10 cm so that five specimens of the rectangular area R as schematically illustrated in FIG. 3 were prepared. Each obtained specimen was subjected to ultrasonic cleaning in acetone for 60 seconds, and subjected to observation. A range of the toe 1 mm width×10 cm (rectangular area R as illustrated in FIG. 3) was observed under a SEM. For each specimen, the presence or absence of pinholes each having a circle-equivalent diameter of 10 μm or more was observed, and the average number was calculated following the above-explained method. A case where the obtained average number was three or less was regarded as OK, and a case where the obtained average number was more than four was regarded as NG.

<Evaluation of the Welded Member>

[Evaluation 1: Corrosion Resistance]

As a specimen for the corrosion evaluation, the surface observation specimen after the surface observation was used. For each of the five specimens, after acetone degreasing, an end surface and a rear surface were paint-sealed, and the welded part was evaluated by a 35° C., 5%-salt spray test for three hours. For each specimen, the toe was observed, and the number of occurrences of red rust per range of 1 mm width×10 cm was counted. An average of three counted values excluding the maximum value and the minimum value of obtained five counted values was calculated and regarded as the frequency of the red rust occurrence. A case where the frequency of the red rust occurrence was three or less was regarded as acceptable, a case where the frequency of the red rust occurrence was two or less was regarded as good, a case where the frequency of the red rust occurrence was one or less was regarded as excellent, and a case where the frequency of the red rust occurrence was more than four was regarded as not acceptable.

[Evaluation 2: Plating Adhesiveness Evaluation Under Stress]

For evaluation of the pealing of the plating due to corrosion, evaluation of the plating adhesiveness under stress was carried out. For a specimen for plating adhesiveness evaluation under stress, a portion adjacent to the corrosion evaluation specimen was used. To apply stress, a specimen welded at 90° was widened to 95° and subjected to acetone degreasing and an end surface and a rear surface were paint-sealed, whereby the specimen for plating adhesiveness evaluation under stress was fabricated. The welded part was evaluated by a 35° C., 5%-salt spray test for three hours. A range of 1 mm from the toe was observed, and a specimen without recognition of plating pealing was regarded as OK, and a specimen with plating pealing was regarded as NG.

The obtained results are collectively listed in Table 6 below.

As is clearly found in Table 6 below, the welded members corresponding to examples of the present invention exhibit excellent corrosion resistance. On the other hand, it is found that the welded members corresponding to the comparative examples of the present invention are inferior in corrosion resistance.

[Table 6]

TABLE 6

| | Ni PLATED LAYER MANUFACTURING CONDITIONS | | | | | | |
|---|---|---|---|---|---|---|---|
| No. | PLATING TYPE | ADDITIVE | ADDITIVE (S, C) CONCENTRATION (ppm) | PLATING DEPOSITION AMOUNT (g/m$^2$) | ANNEALING TEMPERATURE ANNEALING TIME | WELDING WIRE | WELDING METHOD |
| 1 | PURE Ni PLATING | H | DETECTION LOWER LIMIT OR LESS | 10 | 700° C. × 20 sec | Nil | LASER |
| 2 | PURE Ni PLATING | H | DETECTION LOWER LIMIT OR LESS | 15 | 700° C. × 20 sec | Nil | LASER |
| 3 | PURE Ni PLATING | H | DETECTION LOWER LIMIT OR LESS | 20 | 700° C. × 20 sec | Nil | LASER |
| 4 | PURE Ni PLATING | H | DETECTION LOWER LIMIT OR LESS | 30 | 700° C.× 20 sec | Nil | LASER |

TABLE 6-continued

| | | | | | | | | |
|---|---|---|---|---|---|---|---|---|
| 5 | PURE Ni PLATING | H | DETECTION LOWER LIMIT OR LESS | 30 | 500° C. × 5 sec | Ni1 | | LASER |
| 6 | PURE Ni PLATING | H | DETECTION LOWER LIMIT OR LESS | 30 | 700° C. × 15 sec | Ni1 | | LASER |
| 7 | PURE Ni PLATING | H | DETECTION LOWER LIMIT OR LESS | 30 | 850° C.× 60 sec | Ni1 | | LASER |
| 8 | PURE Ni PLATING | H | DETECTION LOWER LIMIT OR LESS | 50 | 850° C.× 600 sec | Ni1 | | LASER |
| 9 | PURE Ni PLATING | H | DETECTION LOWER LIMIT OR LESS | 50 | 700° C.× 20 sec | Ni1 | | LASER |
| 10 | PURE Ni PLATING | H | DETECTION LOWER LIMIT OR LESS | 100 | 700° C. × 20 sec | Ni1 | | LASER |
| 11 | PURE Ni PLATING | H | DETECTION LOWER LIMIT OR LESS | 30 | 700° C. × 20 sec | NONE | | LASER |
| 12 | PURE Ni PLATING | H | DETECTION LOWER LIMIT OR LESS | 30 | 700° C.× 20 sec | Ni1 | | ARC (CMT) |
| 13 | PURE Ni PLATING | H | DETECTION LOWER LIMIT OR LESS | 30 | 700° C. × 20 sec | Ni1 | | ARC (DAIHEN) |
| 14 | PURE Ni PLATING | H | DETECTION LOWER LIMIT OR LESS | 30 | NONE | Ni1 | | LASER |
| 15 | BRIGHT PLATING | H, S, C | 20 | 30 | NONE | Ni1 | | LASER |
| 16 | BRIGHT PLATING | H, S, C | 20 | 30 | 700° C. × 20 sec | Ni1 | | LASER |
| 17 | BRIGHT PLATING | H, S, C | 20 | 30 | 850° C.× 60 sec | Ni1 | | LASER |
| 18 | PURE Ni PLATING | H | DETECTION LOWER LIMIT OR LESS | 30 | 700° C. × 20 sec | Ni2 | | LASER |

| | Fe-Ni DIFFUSION ALLOY LAYER | | TOTAL THICK- NESS (μm) | Ni DEPOSI- TION AMOUNT (g/m²) | TOE SURFACE LAYER | | TOE NEAR AREA SURFACE LAYER | |
|---|---|---|---|---|---|---|---|---|
| No. | EXISTENCE SITE | THICK- NESS (μm) | | | Ni CONCEN- TRATION (mass %) | Fe CONCEN- TRATION (mass %) | Ni CONCEN- TRATION (mass %) | Fe CONCEN- TRATION (mass %) |
| 1 | ENTIRE SURFACE | 1.0 | 2.1 | 18.9 | 50 | 50 | 60 | 40 |
| 2 | ENTIRE SURFACE | 1.0 | 2.7 | 23.9 | 80 | 20 | 100 | 0 |
| 3 | ENTIRE SURFACE | 1.0 | 3.2 | 28.9 | 80 | 20 | 100 | 0 |
| 4 | ENTIRE SURFACE | 1.0 | 4.4 | 38.9 | 80 | 20 | 100 | 0 |
| 5 | ENTIRE SURFACE | 0.3 | 3.7 | 32.7 | 60 | 40 | 100 | 0 |
| 6 | ENTIRE SURFACE | 0.5 | 3.9 | 34.5 | 70 | 30 | 100 | 0 |
| 7 | ENTIRE SURFACE | 1.5 | 4.9 | 43.4 | 90 | 10 | 100 | 0 |
| 8 | ENTIRE SURFACE | 3.0 | 8.6 | 76.7 | 90 | 10 | 100 | 0 |
| 9 | ENTIRE SURFACE | 1.0 | 6.6 | 58.9 | 80 | 20 | 100 | 0 |
| 10 | ENTIRE SURFACE | 1.0 | 12.2 | 108.9 | 80 | 20 | 100 | 0 |
| 11 | ENTIRE SURFACE | 1.0 | 4.4 | 38.9 | 50 | 50 | 50 | 50 |
| 12 | ENTIRE SURFACE | 1.0 | 4.4 | 38.9 | 80 | 20 | 100 | 0 |
| 13 | ENTIRE SURFACE | 1.0 | 4.4 | 38.9 | 60 | 40 | 50 | 50 |
| 14 | ONLY WELDED HEATED PART | 0.0 | 3.4 | 30.0 | 50 | 50 | 100 | 0 |
| 15 | ONLY WELDED HEATED PART | 0.0 | 3.4 | 30.0 | 30 | 70 | 100 | 0 |
| 16 | ENTIRE SURFACE | 1.0 | 4.4 | 38.9 | 70 | 30 | 100 | 0 |
| 17 | ENTIRE SURFACE | 1.5 | 4.9 | 43.4 | 70 | 30 | 100 | 0 |
| 18 | ENTIRE SURFACE | 1.0 | 4.4 | 38.9 | 80 | 20 | 100 | 0 |

TABLE 6-continued

| | WELDED PART SURFACE LAYER | | | | | | |
|---|---|---|---|---|---|---|---|
| | Ni CONCENTRATION (mass %) | Fe CONCENTRATION (mass %) | ANALYSIS 1 | ANALYSIS 2 | EVALUATION 1 | EVALUATION 2 | NOTE |
| 1 | 50 | 50 | OK | OK | NON ACCEPTABLE | OK | COMPARATIVE EXAMPLE |
| 2 | 80 | 20 | OK | OK | ACCEPTABLE | OK | EXAMPLE |
| 3 | 80 | 20 | OK | OK | GOOD | OK | EXAMPLE |
| 4 | 80 | 20 | OK | OK | EXCELLENT | OK | EXAMPLE |
| 5 | 80 | 20 | OK | NG | NON ACCEPTABLE | OK | COMPARATIVE EXAMPLE |
| 6 | 70 | 30 | OK | OK | EXCELLENT | OK | EXAMPLE |
| 7 | 80 | 20 | OK | OK | EXCELLENT | OK | EXAMPLE |
| 8 | 90 | 10 | OK | OK | EXCELLENT | NG | COMPARATIVE EXAMPLE |
| 9 | 80 | 20 | OK | OK | EXCELLENT | OK | EXAMPLE |
| 10 | 80 | 20 | OK | OK | EXCELLENT | OK | EXAMPLE |
| 11 | 50 | 50 | OK | OK | NON ACCEPTABLE | OK | COMPARATIVE EXAMPLE |
| 12 | 80 | 20 | OK | OK | EXCELLENT | OK | EXAMPLE |
| 13 | 50 | 50 | OK | OK | NON ACCEPTABLE | OK | COMPARATIVE EXAMPLE |
| 14 | 50 | 50 | OK | NG | NON ACCEPTABLE | NG | COMPARATIVE EXAMPLE |
| 15 | 30 | 70 | NG | NG | NON ACCEPTABLE | NG | COMPARATIVE EXAMPLE |
| 16 | 70 | 30 | NG | NG | NON ACCEPTABLE | OK | COMPARATIVE EXAMPLE |
| 17 | 70 | 30 | NG | NG | NON ACCEPTABLE | OK | COMPARATIVE EXAMPLE |
| 18 | 80 | 20 | OK | OK | EXCELLENT | OK | EXAMPLE |

Preferred embodiments of the present invention have been described above in detail with reference to the attached drawings, but the present invention is not limited to the embodiments. It should be understood that various changes and modifications are readily apparent to those skilled in the art who have the common general knowledge in the technical field to which the present invention pertains, within the scope of the technical spirit as set forth in claims, and they should also be covered by the technical scope of the present invention.

EXPLANATION OF CODES

1 welded member
10 Ni plated steel sheet
20 welded part
101 steel sheet
103 Ni plating layer
105 Fe—Ni diffusion alloy layer

What is claimed is:

1. A welded member made by connecting a nickel (Ni) plated steel sheet and another steel sheet via a welded part, wherein:
the Ni plated steel sheet has a steel sheet which is a base sheet, a Ni plating layer located on the steel sheet, and an iron and nickel (Fe—Ni) diffusion alloy layer located between the steel sheet and the Ni plating layer;
a Ni concentration is 70 mass % or more and a Fe concentration is 30 mass % or less in a surface layer of each of (a) a toe, (b) a toe near area which is an area of the Ni plated steel sheet at a distance from the toe in a direction away from the welded part of 10 μm or more and 1 mm or less, and (c) the welded part;
wherein the toe corresponds to a portion where a surface of the Ni plating layer in the Ni plated steel sheet intersects with the surface of the welded part; and
when a portion which has not been subjected to welding in the Ni plated steel sheet is regarded as a non-welded part,
a thickness of the Fe—Ni diffusion alloy layer is 0.5 to 1.5 μm and a total thickness of the Ni plating layer and the Fe—Ni diffusion alloy layer is 2.7 to 14.0 μm at the non-welded part, and a total concentration of sulfur (S) and carbon (C) in the Ni plating layer at the non-welded part is less than 20 ppm.

2. The welded member according to claim 1, wherein the Ni concentration and the Fe concentration in the surface layer of each of the toe, the toe near area, and the welded part are measured by Auger spectroscopy on faces of the toe, the Ni plated steel sheet, and the welded part, wherein the faces are obtained by a process wherein argon (Ar) ion etching is performed on surfaces of the toe, the Ni plated steel sheet, and the welded part until an oxygen concentration becomes 25 mass % or less.

3. The welded member according to claim 1, wherein the Ni concentration is 90 mass % or more and the Fe concentration is 10 mass % or less, in the surface layer of each of the toe, the toe near area, and the welded part.

4. The welded member according to claim 1, wherein a Ni deposition amount of the Ni plated steel sheet is 20 to 100 g/m$^2$ in terms of metal.

5. The welded member according to claim 1, wherein a number of pinholes, each having a circle-equivalent diameter of 10 μm or more, are located in a rectangular area being an area that extends 10 cm in the direction of the toe and is situated up to 1 mm away from the welded part on a surface of the Ni plating layer, is three or less.

* * * * *